(12) United States Patent
Massie

(10) Patent No.: US 6,413,005 B1
(45) Date of Patent: Jul. 2, 2002

(54) FASTENER HAVING A SELF-CENTERING AND SELF-ALIGNING CAPABILITY FOR ONE-SIDED INSERTION AND TIGHTENING ON A SLAT FLOOR

(75) Inventor: Thomas A. Massie, Wahoo, NE (US)

(73) Assignee: Wahoo Concrete Products, Inc., Wahoo, NE (US)

( * ) Notice: Subject to any disclaimer, the term of this patent is extended or adjusted under 35 U.S.C. 154(b) by 0 days.

(21) Appl. No.: 09/274,309

(22) Filed: Mar. 23, 1999

(51) Int. Cl.[7] .............................. F16B 2/14; F16B 37/00
(52) U.S. Cl. .................... 403/334; 403/409.1; 403/260; 411/104; 411/85; 119/529
(58) Field of Search ................................. 403/334, 333, 403/337, 374.1, 374.3, 13, 14, 409.1, 260, 258; 411/84, 85, 104; 52/710; 119/509, 528–530

(56) References Cited

U.S. PATENT DOCUMENTS

| | | | |
|---|---|---|---|
| 568,802 A | * 10/1896 | Seaman | 403/409.1 |
| 751,321 A | * 2/1904 | Miller | 248/323 |
| 950,771 A | * 5/1910 | Lohmann | 52/710 |
| 1,161,231 A | * 11/1915 | Landine | 403/110 X |
| 2,714,320 A | * 8/1955 | McDonald | 403/334 |
| 2,727,220 A | * 12/1955 | Buchanan et al. | 403/286 X |
| 2,809,726 A | * 10/1957 | Farquhar et al. | 411/427 X |
| 2,936,501 A | * 5/1960 | Kock | 411/104 |
| 3,150,703 A | * 9/1964 | Preziosi | 411/84 X |
| 3,507,315 A | * 4/1970 | Tummarello | 248/25 |
| 3,593,472 A | * 7/1971 | Bargar | 52/710 |
| 3,908,330 A | * 9/1975 | Frach et al. | 403/348 X |
| 4,027,711 A | * 6/1977 | Tummarell | 248/25 |
| 4,348,987 A | * 9/1982 | Herring | 119/509 |
| 4,536,116 A | * 8/1985 | Murray | 411/82 |
| 4,575,295 A | * 3/1986 | Rebentisch | 411/85 |
| 4,818,578 A | * 4/1989 | Moghe | 403/400 |
| 4,881,296 A | * 11/1989 | Marinoni | 16/237 |
| 4,950,999 A | * 8/1990 | Roellin | 403/348 |
| 5,057,649 A | * 10/1991 | Ring | 411/437 X |
| 5,092,550 A | * 3/1992 | Bettini | 411/301 X |
| 5,116,161 A | * 5/1992 | Faisst | 403/231 |
| 5,142,832 A | * 9/1992 | Branham, Sr. et al. | 248/323 |
| 5,199,836 A | * 4/1993 | Gogarty | 411/84 |
| 5,746,535 A | * 5/1998 | Kohler | 403/258 |
| 5,839,787 A | * 11/1998 | Magnuson et al. | 411/85 |

* cited by examiner

Primary Examiner—Lynne H. Browne
Assistant Examiner—Ernesto Garcia
(74) Attorney, Agent, or Firm—Rothwell, Figg, Ernst & Manbeck

(57) ABSTRACT

A fastener for securing objects to a slat floor, having a self-centering and self-aligning capability. A first embodiment comprises a body formed of a durable material and having a top surface, a lower surface, at least one side surface, and a central hole extending between the top surface and the lower surface. A second embodiment comprises a body formed of a durable material and having a top surface, a lower surface, at least one side surface, and a central hole extending between the top surface and the lower surface, wherein the top surface of the body has a flat central surface and two sloping upper surfaces starting adjacent to the flat central surface and angling downward toward either end of the body, and a lower fastener component that is coaxial with the central hole.

20 Claims, 4 Drawing Sheets

FASTENER HAVING A SELF-CENTERING AND SELF-ALIGNING CAPABILITY FOR ONE-SIDED INSERTION AND TIGHTENING ON A SLAT FLOOR

BACKGROUND OF THE INVENTION

1. Field of the Invention

The present invention relates generally to a fastener having a self-centering and self-aligning capability for one-sided insertion and tightening on a slat floor, and more specifically to a fastener for use in an animal confinement pen.

2. Description of Background Art

Animal confinement pens are commonly used to feed livestock in preparation for market. Confinement pens hold animals in a restricted space where they can be heavily fed in order to promote fast growth. Confinement pens may additionally prevent the animals from fighting or injuring each other, and the close quarters prevents the animals from being too active, which results in an overly muscular and tough food animal.

Confinement pens are commonly constructed with a flooring upon which the animals stand or rest, as a dirt floor in a confinement pen quickly becomes wet or muddy and may be a cause of disease or infection. Therefore, slat floors, having regularly spaced slat openings, are commonly used to keep the confined animals up off of the ground while allowing animal wastes to fall through the openings between slats and be disposed of.

A slat floor as is commonly used in animal confinement operations is constructed of precast concrete gang slats available in various sizes, with a standard slat floor being constructed of four foot by ten foot concrete gang slat panels placed upon a support structure. The panels contain regularly spaced slat openings through which animal waste material may pass. In a typical panel, the slat openings are approximately one inch in width. Below the slat floor is a waste collection and disposal area. Above the slat floor, multiple pen units comprised of connected fence panels, feed dispensers, and water dispensers are typically constructed, and may be fastened to the slat floor to prevent movement or damage by the confined animals. Therefore, some type of fastener is commonly employed during construction to fasten the above items to the slat floor, or to later add new pieces of equipment to the confinement pen.

A prior art approach to fastening items to the slat floor is a fastener which may be placed below the slat floor and receives a corresponding fastener bolt through a slat opening. In this manner, various items may be fastened to the slat floor. The prior art fastener has a rounded upper body that is wider than the slat opening and has a central hole and an embedded nut through which a fastener bolt may be inserted and tightened.

The prior art approach has several drawbacks. First, due to the width of the prior art fastener, the device cannot be inserted down through the slat opening from above. This is a big drawback for repairs or additions to existing confinement pen structures, as the alternative is to install the fastener from below by access through the animal waste collection and removal area. This is not only very unpleasant, but may also be inconvenient or difficult, depending on the clearance available underneath the slat floor.

Second, due to the substantially rounded upper surface employed in the prior art, a prior art device does not self-center in the slat opening when upward force is applied to the prior art fastener. Unless the prior art device is restrained by force, it will likely turn in the slat opening when the corresponding fastener bolt is turned. This obviously makes an installation job more difficult and time-consuming.

Third, the prior art device is not shaped so as to force itself into cross-alignment with the slat opening, with the result that the prior art fastener device may need to be independently held in position while the fastener bolt is tightened.

What is needed therefore is a fastener having a self-centering and self-aligning capability for one-sided insertion and tightening on a slat floor.

SUMMARY OF THE INVENTION

It is therefore an object of the invention to provide a new and improved fastener for a slat floor in an animal confinement pen.

It is another object of the invention to provide a fastener that is self-centering in a slat floor opening when an upward force is supplied to the fastener.

It is yet another object of the invention to provide a fastener that brings itself into cross-alignment with a slat floor opening when an upward force is supplied to the fastener.

It is yet another object of the invention to provide a fastener that can be inserted through a slat floor opening from a top side of a slat floor.

It is yet another object of the invention to provide a fastener that can be tightened from a top side of a slat floor.

It is yet another object of the invention to provide a fastener that can be inserted below an existing structure situated on a slat floor.

A fastener for securing objects to a slat floor, having a self-centering capability, is provided according to a first aspect of the present invention. The fastener comprises a body formed of a durable material and having a top surface, a lower surface, at least one side surface, and a central hole extending between the top surface and the lower surface, wherein the top surface of the body has a flat central surface and two sloping upper surfaces starting adjacent to the flat central surface and angling downward toward either end of the body.

A fastener for securing objects to a slat floor, having a self-centering capability, is provided according to a second aspect of the present invention. The fastener comprises a body formed of a durable material and having a top surface, a lower surface, at least one side surface, and a central hole extending between the top surface and the lower surface, wherein the top surface of the body has a flat central surface and two sloping upper surfaces starting adjacent to the flat central surface and angling downward toward either end of the body, and a fastener that is coaxial with the central hole.

The above and other objects, features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
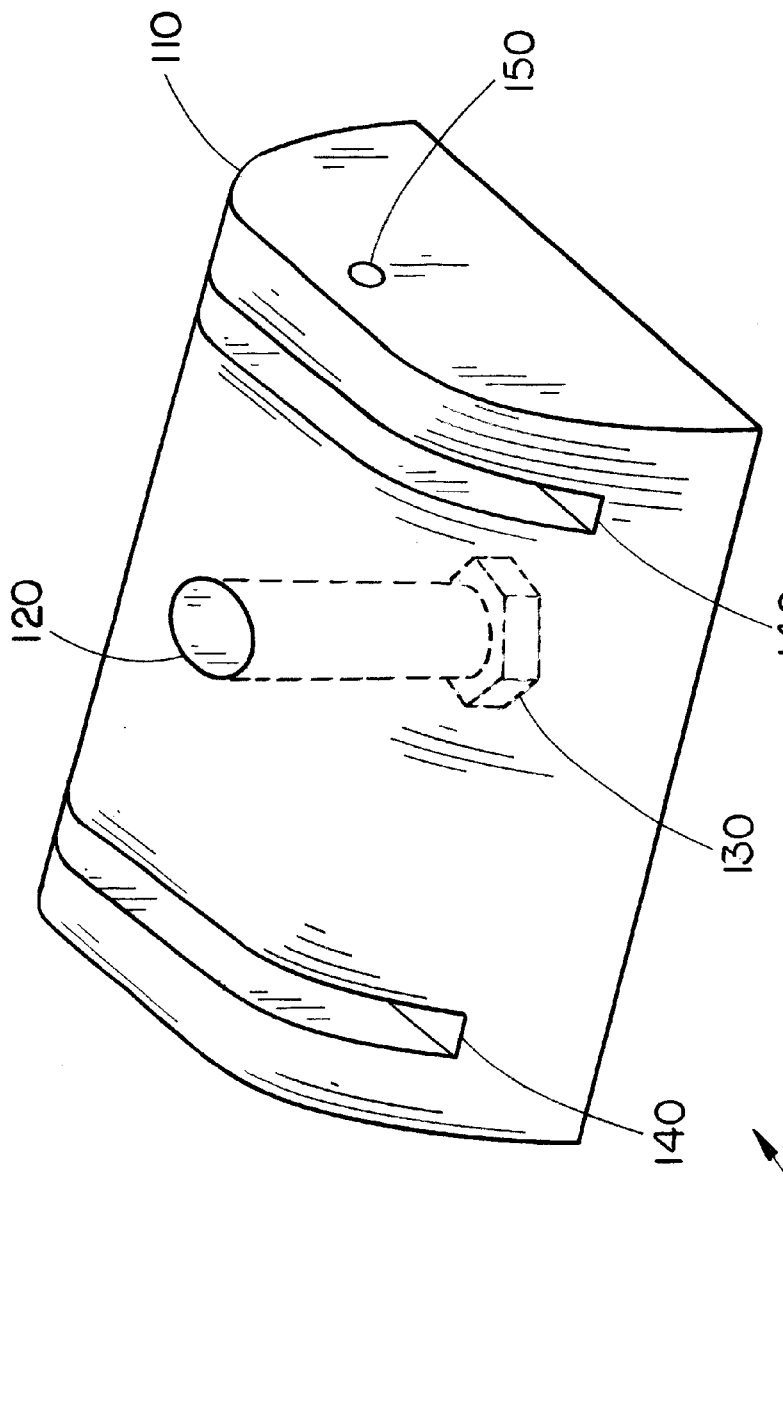
FIG. 1 shows a fastener device of the prior art.

FIG. 1 shows a fastener device 100 of the prior art. The prior art fastener 100 has a rounded upper surface 110, a central hole 120, an embedded fastener 130, slots 140, and a hole 150. The prior art fastener 100 is made of a molded plastic, and is placed below a slat opening in a slat floor. A common bolt type fastener is inserted into the central hole 120 from above and screwed into the embedded fastener 130. In this manner, the prior art fastener 100 may be used to fasten equipment to an upper surface of a slat floor. The slots 140 may be used to position or restrain an item being fastened to the slat floor. The hole 150 may be used in conjunction with a tool to hold the prior art fastener 100 in position below a slat opening.

Figure 2:
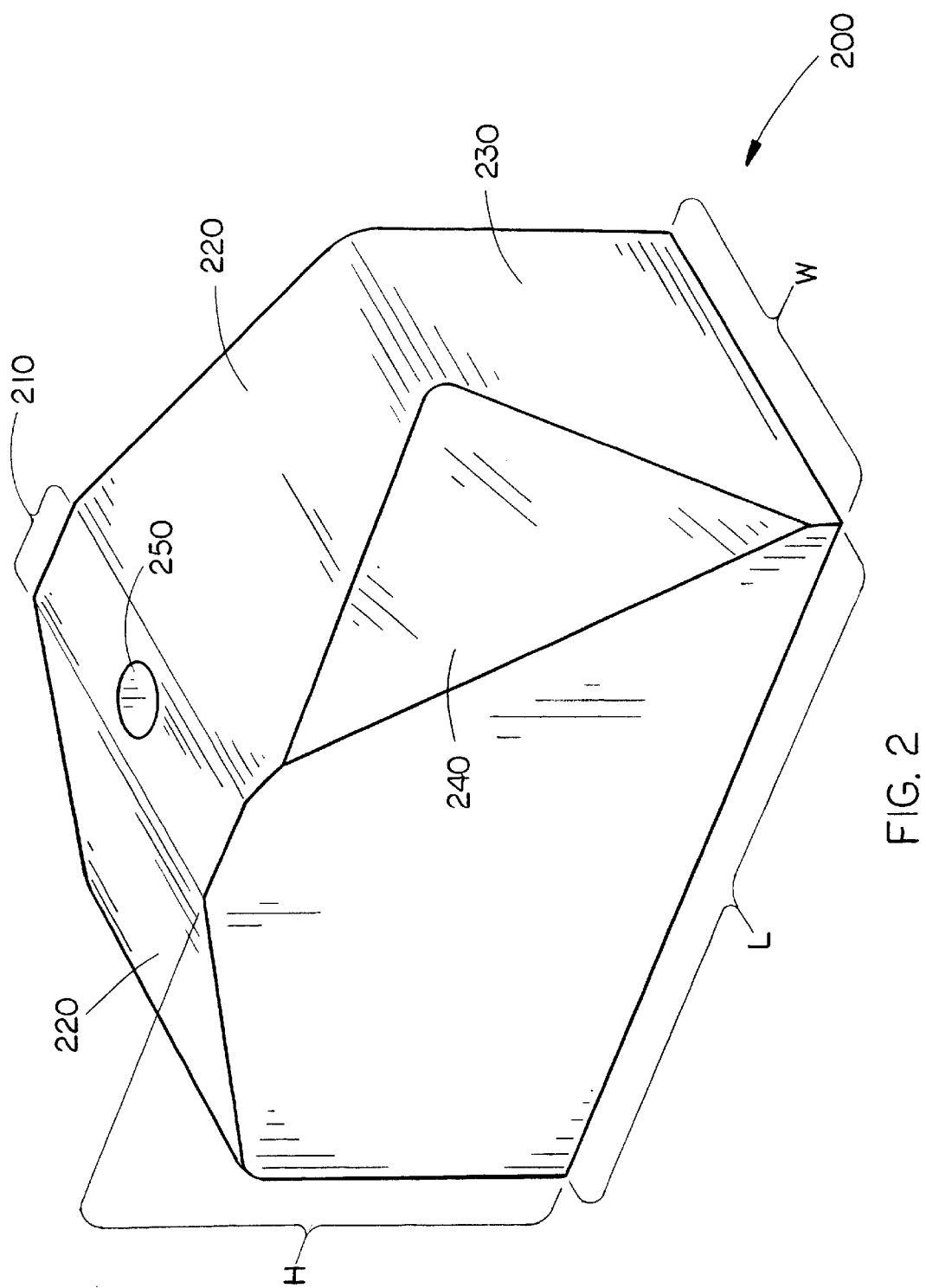
FIG. 2 shows one embodiment of a fastener device according to the present invention.

FIG. 2 shows one embodiment of a fastener 200 of the present invention. The fastener 200 has a flat upper surface 210, two sloping upper surfaces 220, two substantially vertical end surfaces 230, a bevel 240, and a central hole 250. The two sloping upper surfaces 220 are preferably at an angle from the horizontal of approximately twenty-nine degrees, but may range from, for example, ten to sixty degrees in angle. The width W of the fastener 200 in the preferred embodiment is approximately seven eighths of an inch, which allows the fastener 200 to fit through a standard one inch slat opening. Alternatively, the width W of the fastener 200 may vary from, for example, about one-quarter of an inch to about six inches, depending on the size of the slat opening. In the preferred embodiment, the fastener 200 has a length L of approximately one and eleven sixteenths inches, but the length L may vary from about one-quarter of an inch to about twelve inches. In the preferred embodiment, the fastener 200 has a height H of fifteen sixteenths of an inch, but the height H may vary from about one-quarter of an inch to about twelve inches.

In the preferred embodiment, the fastener 200 is made of a thermoplastic resin, and more particularly of a thirty percent glass-filled thermoplastic resin. It will be obvious to one skilled in the art that other materials may be used to make the fastener 200, such as wood, metal, or other plastics having satisfactory qualities.

In use, the central hole 250 is capable of receiving an upper fastener component, such as a bolt or a screw (not shown). The two sloping upper surfaces 220 function to bring the fastener 200 into a centered position with respect to a slat opening in a slat floor, so that the upper surface 210 and the central hole 250 are centered in the slat opening. The upper fastener component, whether it be a screw or a bolt, may be started into the fastener 200 prior to the fastener 200 being inserted downward through an opening in the slat floor. Alternatively, the fastener 200 may be placed underneath an item already in place on the slat floor by means of a tool and then the upper fastener component may be inserted downward into the fastener 200. When the threads of the upper fastener component meet the thread locking capability of the fastener 200 (discussed below) the fastener 200 will turn with the upper fastener component unless a restraining force is applied to the fastener 200. Due to this thread locking capability, the fastener 200 will turn with the upper fastener component unless it is brought upward into contact with the lower surface of the slat floor. The angled surface of the bevel 240 translates a portion of an upward force into rotational force when the fastener 200 is forced upward into contact with the lower surface of a slat floor. In this manner, the fastener 200 is brought into cross-alignment with the slat opening in the slat floor, and held in alignment by the sloping upper surfaces 220. The fastener 200 can therefore be inserted downward through a slat opening from the upper side of the slat floor, can center itself in the slat opening, and can seek and maintain a position of cross-alignment while being tightened, so that the fastener 200 may function to fasten an item firmly to the slat floor.

In one embodiment, an upper fastener component such as a screw (not shown) is used in conjunction with the fastener 200. The screw can be used to fasten an item to the fastener 200 by screwing the screw into the central hole 250 of the fastener 200. In this embodiment, the central hole 250 must be of a diameter that is less than the diameter of the screw, so that the threads of the screw will be forced into the material of the fastener 200. The central hole 250 may be of a depth sufficient to accommodate the screw, or alternatively may be deeper, including a central hole 250 that passes all the way through the fastener 250. In addition, the material of the fastener 200 may be displaced by the screw threads of the screw, creating a friction sufficient to create a thread locking capability between the screw and the fastener 200.

Figure 3:
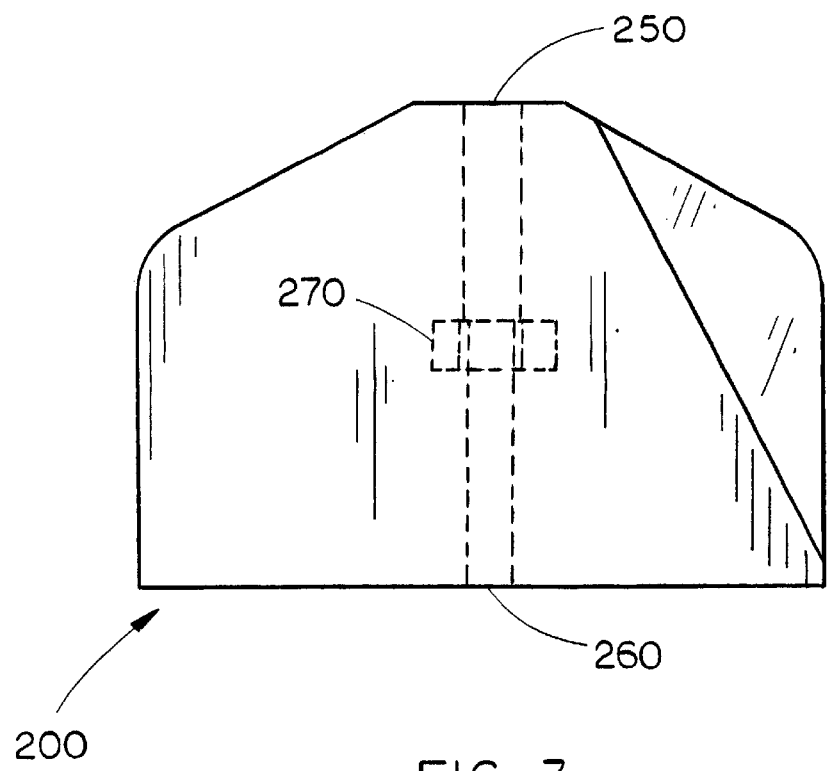
FIG. 3 shows a side view of a preferred embodiment of the fastener device having a centrally embedded fastener.

FIG. 3 is a side view of the preferred embodiment of the fastener 200. The preferred embodiment of the fastener 200 includes an upper central hole 250, a lower central hole 260, and a lower fastener component 270. The lower fastener component 270 is a threaded nut, although alternatively the lower fastener component 270 could be a spring clip or other retainer that attaches to a corresponding upper fastener component inserted into the central hole 250. The lower fastener component 270 is embedded in substantially the center of the fastener 200. Additionally, the lower fastener component 270 is coaxial with both the upper central hole 250 and the lower central hole 260, which are also coaxial with each other.

Due to the embedded nature of the lower fastener component 270, it is firmly held in place and cannot turn with respect to the fastener 200 when an upper fastener component is inserted and tightened. The upper central hole 250 is sized to accommodate an inserted upper fastener component, and in the preferred embodiment can accommodate a bolt of three-eights of an inch in diameter. The lower central hole 260 is slightly smaller than the upper central hole 250. The smaller diameter of the lower central hole 260 provides a locking effect to the bolt fastener, as any threaded portion of the bolt that extends beyond the lower fastener component 270 will bite into the sidewall of the lower central hole 260, with the friction generated between the bolt and the fastener 200 being sufficient to prevent removal of the bolt unless sufficient torque is exerted on the bolt. In the preferred embodiment, the lower central hole 260 is approximately eleven thirty-seconds of an inch to one quarter of an inch in diameter when a three-eighths inch bolt is being used.

Figure 4:
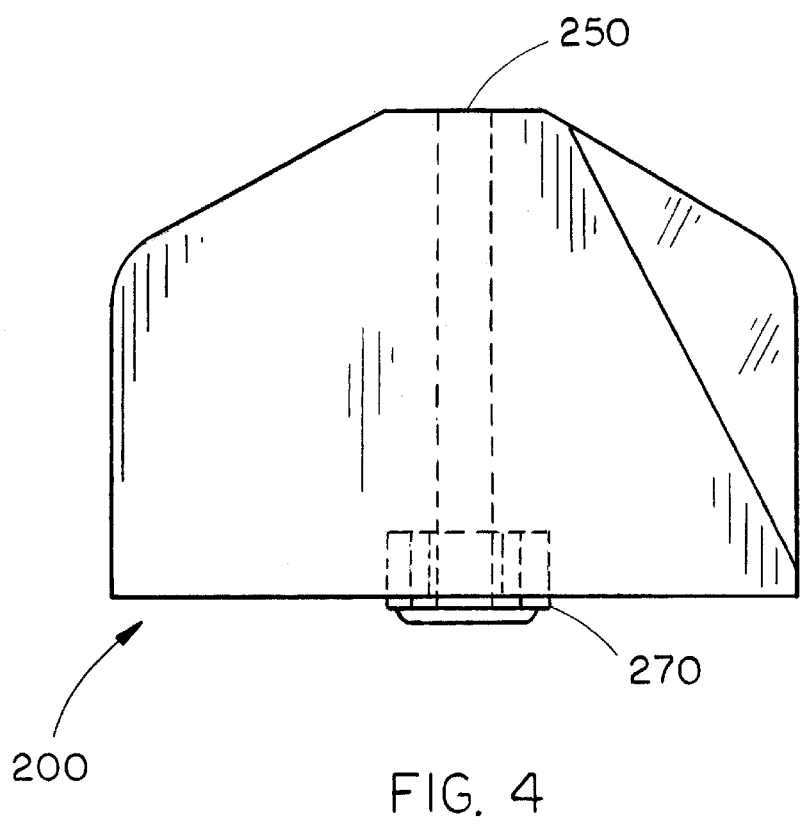
FIG. 4 shows a side view of an alternative embodiment of the fastener device having a fastener embedded in a bottom surface of the fastener.

FIG. 4 is a side view of an alternative embodiment of the fastener 200, showing the placement of a lower fastener component 270 embedded in the lower surface of the fastener 200 and coaxial with the central hole 250. The lower fastener component 270 is a threaded lock nut, although alternatively the lower fastener component 270 could be a spring clip or other retainer that attaches to a corresponding fastener component inserted into the central hole 250. The embedded lower fastener component 270 is held in the fastener 200 by friction, although alternatively it could be loose or held in place by an adhesive or other means. It will be obvious that although the lower fastener component 270 is shown as being recessed into the fastener 200, it could alternatively rest on the lower surface of the fastener 200.

Figure 5:
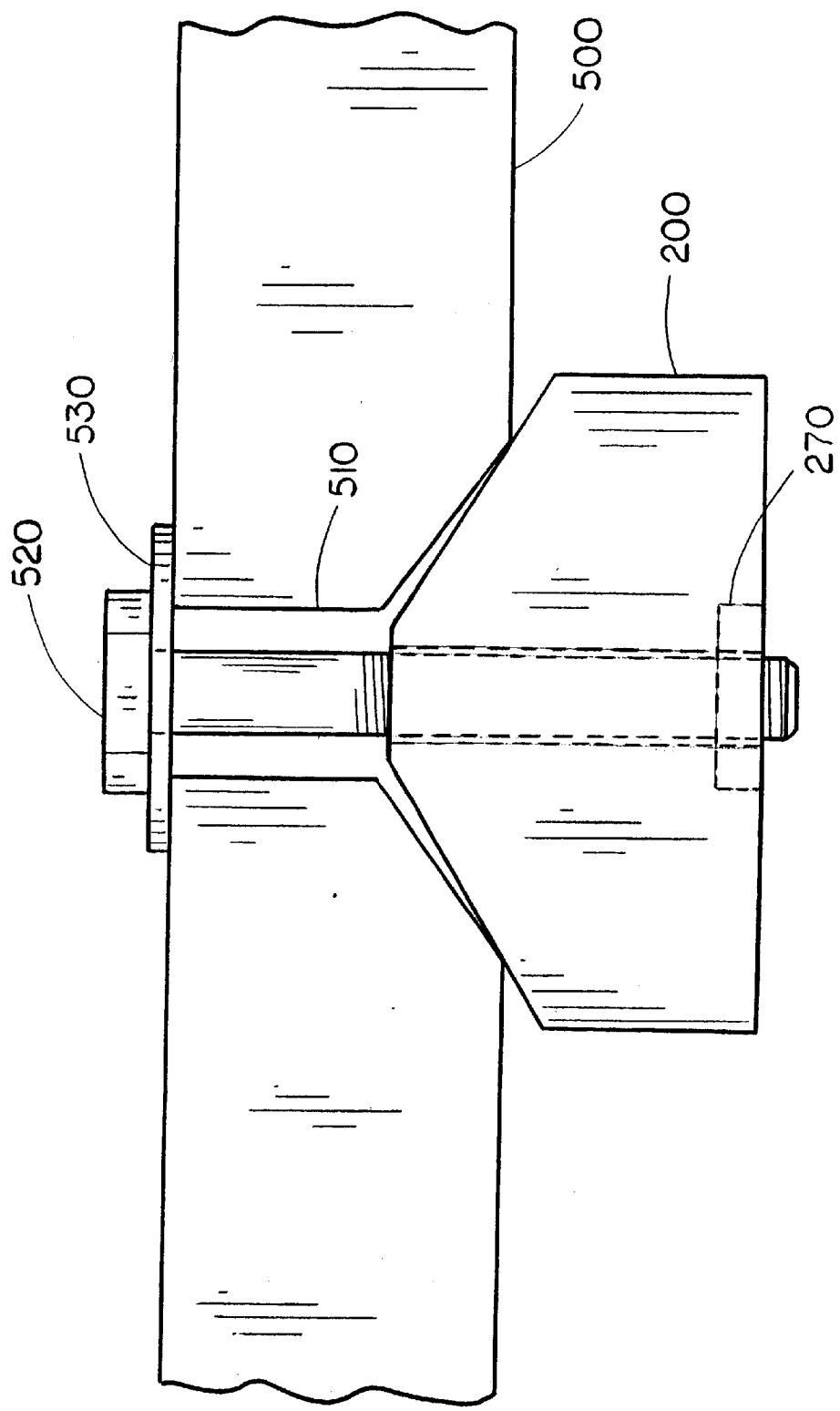
FIG. 5 shows the fastener device in use in a slat opening of a slat floor.

FIG. 5 illustrates the use of the fastener 200. The slat floor 500 is generally constructed of concrete of four to five inches in thickness. The slat opening 510 in the slat floor is generally one inch in width. The upper fastener component 520 passes through an item 530 which is to be fastened to the slat floor 540, and then into the fastener 200.

In use, the fastener 200 is inserted length-wise through the slat opening 510 and then rotated into cross-alignment with the slat opening 510, as shown. The upper fastener component 520 is screwed into the fastener 200 in order to bring the fastener 200 into firm contact with the slat floor 500. In this manner, the item 530 can be firmly fastened to the slat floor 500 with the advantage that the fastener 200 can be inserted, cross-aligned, and tightened from the top side of an existing slat floor. Although the opening is shown having beveled surfaces corresponding to the sloping upper surfaces 220, it should be understood that the fastener 200 may be used with any configuration of hole or slot opening, including openings having bevels or sloped sides.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A fastener system having a self-centering and self-aligning capability, comprising:

a slat floor in an animal confinement pen, said slat floor including a plurality of slat openings;

a threaded fastener including a head portion and a threaded shank portion;

a body formed of a durable material and having a top surface, a lower surface, at least one side surface, and a central hole extending between said top surface and said lower surface, wherein said top surface of said body has a flat central surface and two sloping, substantially planar upper surfaces starting adjacent to said flat central surface, each respectively angling downward toward an end of said body, and extending across a width of said body, said two sloping upper surfaces functioning to bring said fastener into a centered, cross-alignment position with respect to a slat opening of said plurality of slat openings and retaining said fastener in said cross-alignment position, a width dimension of said body being narrower than said slat opening and a length dimension of said body being wider than said slat opening;

wherein said body is capable of being screwed onto said threaded fastener, inserted in a one-sided fashion through said slat opening, turned in a one-sided fashion into contact with said slat floor and essentially turned into a cross-alignment with said slat opening, and tightened in a one-sided fashion against said slat floor.

2. The fastener of claim 1, wherein said body is made of a plastic material.

3. The fastener of claim 1, wherein said body is made of a thermoplastic resin.

4. The fastener of claim 1, wherein said two sloping, substantially planar upper surfaces on said top surface of said body are at an angle of ten degrees to about sixty degrees.

5. The fastener of claim 1, wherein said two sloping, substantially planar upper surfaces on said top surface of said body are at an angle of about twenty-nine degrees from horizontal.

6. The fastener of claim 1, wherein a width of said body is about seven eighths of an inch, making said fastener capable of being inserted through a slat opening.

7. The fastener of claim 1, wherein said at least one side surface further includes four side surfaces.

8. A fastener system having a self-centering and self-aligning capability, comprising:

a slat floor in an animal confinement pen, said slat floor including a plurality of slat openings;

a threaded fastener including a head portion and a threaded shank portion;

a body formed of a durable material and having a top surface, a lower surface, at least one side surface, and a central hole extending between said top surface and said lower surface, wherein said top surface of said body has a flat central surface and two sloping, substantially planar upper surfaces starting adjacent to said flat central surface, each respectively angling downward toward an end of said body, and extending across a width of said body, said two sloping upper surfaces functioning to bring said fastener into a centered, cross-alignment position with respect to a slat opening of said plurality of slat openings and retaining said fastener in said cross-alignment position, a width dimension of said body being narrower than said slat opening and a length dimension of said body being wider than said slat opening; and a lower fastener component that is coaxial with said central hole and embedded in said body, said lower fastener component being capable of accepting said threaded fastener;

wherein said body is capable of being started onto said threaded fastener, inserted in a one-sided fashion through said slat opening, said two sloping upper surfaces turned in a one-sided fashion into contact with said slat floor and essentially turned into a cross-alignment with said slat opening, and tightened in a one-sided fashion against said slat floor.

9. The fastener of claim 8, wherein said at least one side surface further includes four side surfaces.

10. The fastener of claim 8, wherein said lower fastener component is a threaded nut.

11. The fastener of claim 8, wherein said lower fastener component is a threaded nut having a locking thread capability.

12. The fastener of claim 8, wherein said lower fastener component is coexistent with said lower surface of said body.

13. The fastener of claim 8, wherein said lower fastener component is embedded in said lower surface of said body.

14. The fastener of claim 8, wherein said lower fastener component is substantially centrally embedded in said body.

15. The fastener of claim 14, wherein a lower portion of said central hole below said lower fastener component and adjacent to said lower surface is smaller than an upper portion of said central hole above said lower fastener component and adjacent to said upper surface.

16. The fastener of claim 8, wherein said body is made of a plastic material.

17. The fastener of claim 8, wherein said body is made of a thermoplastic resin.

18. The fastener of claim 8, wherein said two sloping upper surfaces on said top surface of said body are at an angle of from about ten degrees to about sixty degrees.

19. The fastener of claim 8, wherein said two sloping upper surfaces on said top surface of said body are at an angle of about twenty-nine degrees from horizontal.

20. The fastener of claim 8, wherein a width of said body is about seven eighths of an inch, making said fastener capable of being inserted through a slat opening.

* * * * *